United States Patent
Kikuhara et al.

(10) Patent No.: US 10,971,169 B2
(45) Date of Patent: Apr. 6, 2021

(54) SOUND SIGNAL PROCESSING DEVICE

(71) Applicant: AUDIO-TECHNICA CORPORATION, Tokyo (JP)

(72) Inventors: Yasuhito Kikuhara, Tokyo (JP); Toru Aikawa, Chiba (JP); Yuri Jitsukata, Kanagawa (JP)

(73) Assignee: Audio-Technica Corporation, Tokyo (JP)

(*) Notice: Subject to any disclaimer, the term of this patent is extended or adjusted under 35 U.S.C. 154(b) by 0 days.

(21) Appl. No.: 16/614,628

(22) PCT Filed: Mar. 15, 2018

(86) PCT No.: PCT/JP2018/010328
§ 371 (c)(1),
(2) Date: Nov. 18, 2019

(87) PCT Pub. No.: WO2018/211806
PCT Pub. Date: Nov. 22, 2018

(65) Prior Publication Data
US 2020/0152218 A1    May 14, 2020

(30) Foreign Application Priority Data
May 19, 2017    (JP) .................................. 2017-099804

(51) Int. Cl.
*G10L 21/0216*    (2013.01)
*G10L 25/84*    (2013.01)
(Continued)

(52) U.S. Cl.
CPC .......... *G10L 21/0216* (2013.01); *G10L 25/84* (2013.01); *H04R 3/005* (2013.01);
(Continued)

(58) Field of Classification Search
CPC ................. G10L 21/0216; G10L 25/84; G10L 2021/02087; G10L 21/02165;
(Continued)

(56) References Cited

U.S. PATENT DOCUMENTS 10,499,164 B2 * 12/2019 Li ........................... H04R 25/40
2008/0167868 A1    7/2008 Kanevsky
(Continued)

FOREIGN PATENT DOCUMENTS

EP        2 881 946 A1    6/2015
JP        6-83391 A       3/1994
(Continued)

OTHER PUBLICATIONS

Beritelli et al: "Performance Evaluation and Comparison of G.729/AMR/Fuzzy Voice Activity Detectors", IEE Signal Processing Letters, vol. 9, No. 3, Mar. 1, 2002.

*Primary Examiner* — Yogeshkumar Patel
(74) *Attorney, Agent, or Firm* — W&C IP

(57) ABSTRACT

The present invention provides a sound signal processing device that precisely detects various kinds of noises and that does not block output of voice signals even when detecting noise during the output of the voice signals. The sound signal processing device according to the present invention comprises: an input part 10; an input signal determination part 20 that determines whether an input signal from the input part is present; a noise detection part 30 that detects noise included in the input signal from the input part; an output part 80 that outputs the input signal as an output signal; an output switching part 52 that performs switching between an output state in which the output part outputs the output signal and a non-output state in which the output part does not output the output signal; and a control part 60 that controls the switching performed by the output switching part. The control with the control part for switching includes (Continued)

first control that controls the switching based on a determination result r1 from the input signal determination part and a detection result r2 from the noise detection part, and second control that controls the switching based on the determination result from the input signal determination part. One of the first control and the second control is selected based on a state of the output switching part.

10 Claims, 11 Drawing Sheets

(51) Int. Cl.
    *H04R 3/00*     (2006.01)
    *G10L 21/0208*     (2013.01)
    *G10L 25/78*     (2013.01)
(52) U.S. Cl.
    CPC ............... *G10L 2021/02087* (2013.01); *G10L 2021/02165* (2013.01); *G10L 2025/783* (2013.01)

(58) Field of Classification Search
CPC ... G10L 2025/783; G10L 25/78; H04R 3/005; H04R 3/00
See application file for complete search history.

(56) References Cited

U.S. PATENT DOCUMENTS

2008/0279366 A1    11/2008  Lindbergh
2020/0152218 A1\*   5/2020  Kikuhara ............... H04R 3/005

FOREIGN PATENT DOCUMENTS

| | | | |
|---|---|---|---|
| JP | 7-44996 | A | 2/1995 |
| JP | 2008-15481 | A | 1/2008 |
| JP | 2014-53890 | A | 3/2014 |
| JP | 2016051038 | A * | 4/2016 |

\* cited by examiner

SOUND SIGNAL PROCESSING DEVICE

TECHNICAL FIELD

The present invention relates to a sound signal processing device.

BACKGROUND ART

Conference systems are used, for example, for conferences with a large number of attendees, such as congresses and teleconferences. The conference systems provide smooth processing of conferences through processing of sound signals from a plurality of microphones. Some conference systems comprise an auto voice recognition function. The auto voice recognition function is a function to automatically detect speaking (voice) of attendees to control switching between output and block of signals from the microphones.

The auto voice recognition function may misdetect noise of tapping a desk with a pen or of flipping pages, as voice. In this case, control for switching can be carried out between output and block of signals from a microphone without a user's intention. Therefore, this can lead to inadequacy such as releasing noise to a conference hall.

Noise detectors to prevent the auto voice recognition function from misdetecting the noise that is not voice, as voice, have been proposed (for example, see Japanese Unexamined Patent Publication No. H6-83391).

A noise detector disclosed in Japanese Unexamined Patent Publication No. H6-83391 can separately detect silence, noise in a low frequency range (low range), and noise in a high frequency range (high range) by comparing autocorrelation coefficients for different degrees with corresponding thresholds.

SUMMARY OF INVENTION

Technical Problem

A noise detector disclosed in Japanese Unexamined Patent Publication No. H6-83391 can detect impulsive noise having substantially an identical level of frequency spectra from the low range to the high range. Impulsive noise includes, for example, a noise of tapping a desk with a pen. As a result, the noise detector prevents the above-described misdetection. However, the noise detector is unable to detect composite noise in which impulsive noise and a high range noise are synthesized. The composite noise is, for example, a noise of crumpling paper. Consequently, when misdetecting such composite noise as voice, the noise detector releases the noise to a conference hall.

Moreover, the noise detector, disclosed in Japanese Unexamined Patent Publication No. H6-83391, can identify a portion of the voice segment as a noise segment, when detecting a segment including many low frequency band components or many high frequency band components in a voice section from which voice is output. Specifically, in case of detecting noise during output of a voice signal, the noise detector blocks the output of signals from a microphone while an attendee is speaking.

An object of the present invention is to solve the problem described above and to detect precisely various kinds of noises including composite noise and also to provide a sound signal processing device that does not block output of voice signals, even when detecting noise during the output of the voice signals.

Solution to Problem

The sound signal processing device according to the present invention comprises an input part to which a signal is input from a microphone, an input signal determination part that determines whether an input signal from the input part is present, a noise detection part that detects noise included in the input signal from the input part, an output part that outputs the input signal as an output signal, an output switching part that performs switching between an output state in which the output part outputs the output signal and a non-output state in which the output part does not output the output signal, and a control part that controls the switching performed by the output switching part. The control with the control part for switching includes first control that controls the switching based on a determination result from the input signal determination part and a detection result from the noise detection part, and second control that controls the switching based on the determination result from the input signal determination part. One of the first control and the second control is selected based on a state of the output switching part.

Advantageous Effects of Invention

According to the present invention, a sound signal processing device precisely detects various kinds of noises including composite noise and does not block output of voice signals, even when detecting noise during the output of the voice signals.

DESCRIPTION OF EMBODIMENTS

Sound Signal Processing Device

Embodiments of a sound signal processing device according to the present invention will now be described with reference to the attached drawings.

Configuration of Sound Signal Processing Device

Figure 1:
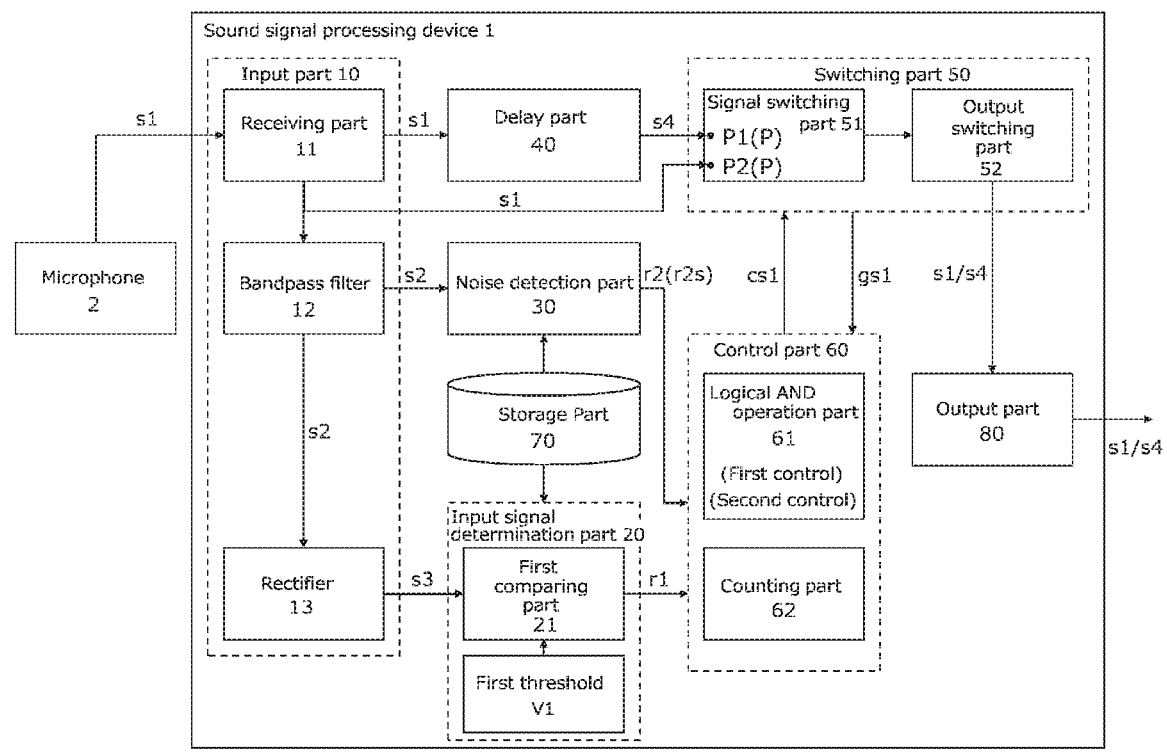
FIG. 1 is a functional block diagram illustrating an embodiment of the sound signal processing device according to the present invention.

FIG. 1 is a functional block diagram illustrating the embodiment of the sound signal processing device (hereinafter referred to as "the device") according to the present invention.

The device 1 performs processing, such as mixing, distribution, balance adjustment, for electric signals (input signal s1) from devices, such as a microphone 2, that convert voice and musical sounds into electric signals. The device 1 is, for example, a mixer and a control part of a conference system.

The device 1 includes an input part 10, an input signal determination part 20, a noise detection part 30, a delay part 40, a switching part 50, a control part 60, a storage part 70, and an output part 80.

The input part 10, for example, connects with the microphone 2, and receives the input signal s1 from the microphone 2. The input signal s1 from the microphone 2 is input to the input part 10, then being input from the input part 10 to the delay part 40 and the switching part 50. The input signal s1 is subjected to below-mentioned processing by the input part 10, and is input to the input signal determination part 20 and the noise detection part 30. The input part 10 includes a receiving part 11, a bandpass filter 12, and a rectifier 13.

The receiving part 11 receives the input signal s1 from the microphone 2, and inputs the input signal s1 to the bandpass filter 12, the delay part 40, and the switching part 50.

The bandpass filter 12 removes low frequency band (low range) signals and high frequency band (high range) signals, from the input signal s1. In other words, the bandpass filter 12 removes noises that have a feature appearing in a lower range, and noises that have a feature appearing in a higher range from the input signal s1. A signal s2 output from the bandpass filter 12 (hereinafter referred to as a "filtered signal") is input to the rectifier 13 and the noise detection part 30.

It should be noted that the bandpass filter may be configured by combining a low pass filter and a high pass filter.

The rectifier 13 converts a filtered signal s2, which is an alternating current signal, into a direct current signal. A direct current signal (hereinafter referred to as a "DC signal") s3, into which the filter signal s2 is converted, is input to the input signal determination part 20.

The input signal determination unit part 20 determines whether the input signal s1 from the microphone 2 (voice signal) is present. The input signal determination part 20 includes a first comparing part 21. The first comparing part 21, for example, compares the DC signal s3 with a first threshold V1 to determine whether the input signal s1 is present. Output from the first comparing part 21, that is, output r1 from the input signal determination part 20 (hereinafter referred to as a "determination result") is input to the control part 60.

The "first threshold V1" is a threshold used by the device 1 determines whether the input signal s1 is present. The first threshold V1 is, for example, a variable being set based on signals corresponding to an environmental sound collected by the microphone 2. The "environmental sound" includes, for example, a sound of an air conditioner in a place (such as a conference room or a hall) in which the device 1 or the microphone 2 is installed and reverberation of a room in which the device 1 or the microphone 2 is installed. The device 1 can determine whether the input signal s1 is present according to the usage environment of the device 1 (for example, whether a room in which the device 1 is installed includes an air conditioner, the size of the room, and a gain value of the microphone 2), with the first threshold V1 being set as a variable. The first threshold V1 is stored in the storage part 70.

It should be noted that the first threshold may be a fixed value corresponding to a usage environment of the device.

The noise detection part 30 detects a feature attributed to noise included in the input signal s1 received from the microphone 2, so as to detect noise included in the input signal s1. Specifically, the noise detection part 30 identifies the input signal s1 as a signal attributed to noise (hereinafter referred to as a "noise signal") or a signal attributed to voice (hereinafter referred to as a "voice signal"). Output r2 output by the noise detection part 30 (hereinafter referred to as a "detection result") is input to the control part 60. The "noise" is, for example, a sound of tapping a desk with a pen, a sound of flipping paper, a sound of sneezing, a sound of clapping hand, or a sound of curling paper.

Figure 2:
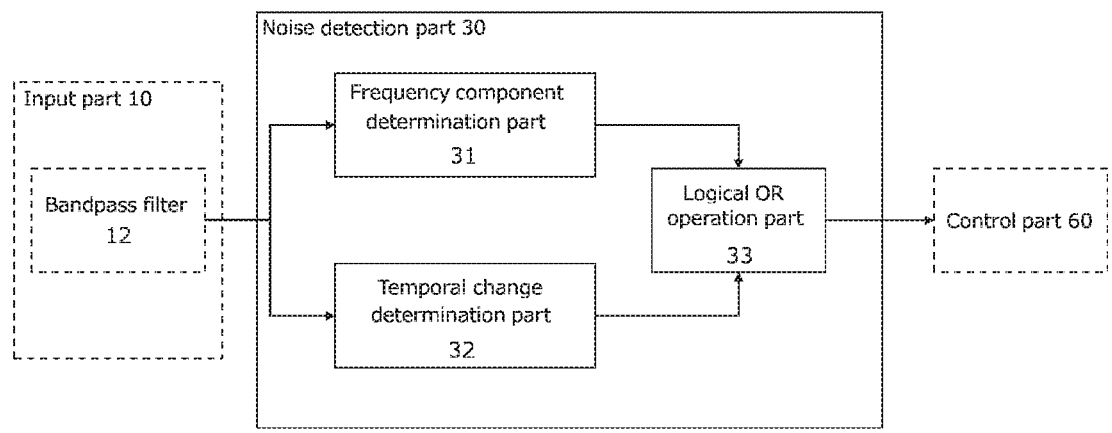
FIG. 2 is a functional block diagram of the noise detection part included in the sound signal processing device in FIG. 1.

FIG. 2 is a functional block diagram of the noise detection part 30. The noise detection part 30 includes a frequency component determination part 31, a temporal change determination part 32, and a logical OR operation part 33.

Figure 3:
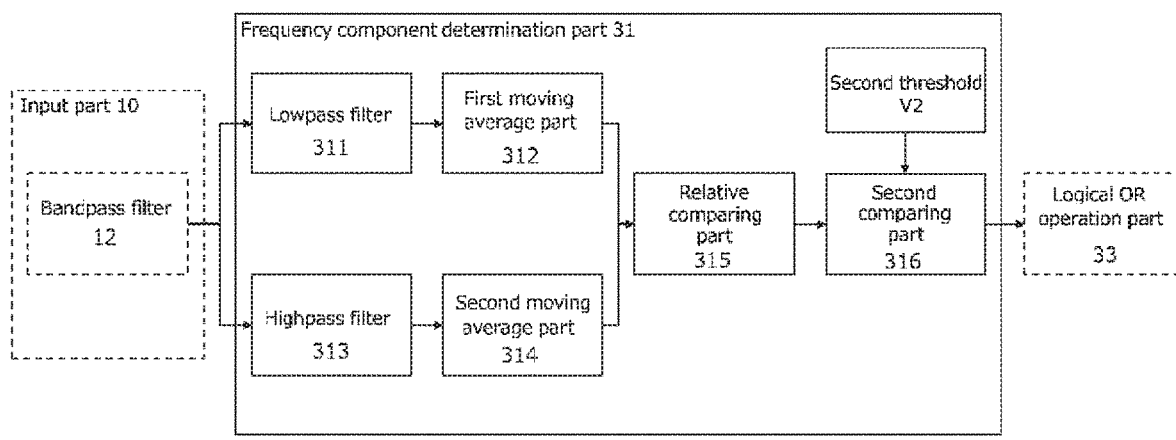
FIG. 3 is a functional block diagram of a frequency component determination part included in a noise detection part in FIG. 2.

FIG. 3 is a functional block diagram of the frequency component determination part 31.

The frequency component determination part 31 determines whether noise is present based on the frequency component of the filtered signal s2 (input signal s1). Normally, the power spectrum of a voice signal represents larger power in a medium-low range than in a high range. Further, the power spectrum of a voice signal tends to appear prominently in a certain part of a frequency band. In contrast, the power spectrum of noise tends to appear across the entire frequency band. The frequency component determination part 31 divides the power spectrum of the filtered signal s2 into the power spectrum in a medium-low frequency band (medium-low range) and the power spectrum in a medium-high frequency band (medium-high range). The frequency component determination part 31 compares the two power spectra, so as to determine whether the filtered signal s2 (input signal s1) is a voice signal or a noise signal.

The medium-low range is, for example, a frequency band including frequencies of approximately 100 Hz to 3 kHz. The medium-high range is, for example, a frequency band including frequencies of 3 kHz or higher.

It should be noted that the medium-low range may overlap with the medium-high range in a part of their frequency bands.

The frequency component determination part 31 includes a lowpass filter 311, a first moving average part 312, a highpass filter 313, a second moving average part 314, a relative comparing part 315, and a second comparing part 316.

The lowpass filter 311 takes out a medium-low range signal from the filtered signals s2.

The first moving average part 312 performs moving average processing for a predetermined number of samples n (for example, n=10) in medium-low range signals that have passed the lowpass filter 311. The first moving average part 312 converts, through this moving average processing, the medium-low range signal into a DC signal and generates a power spectrum of the converted DC signal (hereinafter referred to as a "medium-low signal power spectrum").

The highpass filter 313 takes out a medium-high range signal from the filtered signals s2.

The second moving average 314 performs moving average processing for a predetermined number of samples n (for example, n=10) in medium-high range signals that have passed the highpass filter 313. The second moving average 314 converts, through this moving average processing, the medium-high range signal into a DC signal and generates a power spectrum of the converted DC signal (hereinafter referred to as a "medium-high signal power spectrum").

The relative comparing part 315 compares the medium-low signal power spectrum generated by the first moving average part 312 with a medium-high signal power spectrum generated by the second moving average 314, and calculates difference between the two spectra. The relative comparing part 315 inputs the calculated difference to the second comparing part 316.

The second comparing part 316 compares the difference calculated by the relative comparing part 315 and the second threshold V2, and inputs a signal indicating the result to the logical OR operation part 33. The "second threshold V2" is a threshold used when the frequency component determination part 31 determines whether the filtered signal s2 (input signal s1) is a voice signal or a noise signal. The second threshold V2 is stored in the storage part 70 (refer to FIG. 1).

Figure 4:
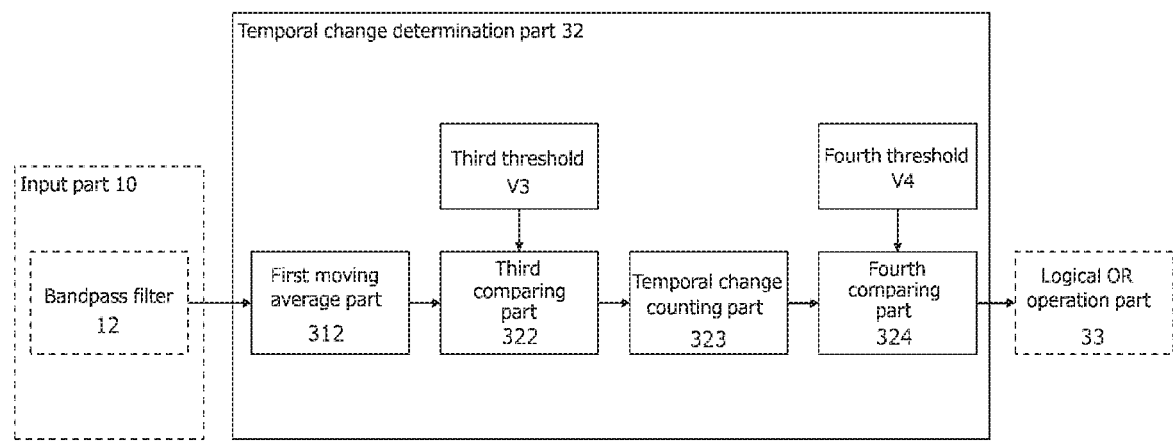
FIG. 4 is a functional block diagram of a temporal change determination part included in the noise detection part in FIG. 3.

FIG. 4 is a functional block diagram of the temporal change determination part 32. The temporal change determination part 32 determines whether noise is present based on the temporal change of the filtered signal s2 (input signal s1). Normally, a time-base waveform of impulsive noise steeply changes immediately after the occurrence of the noise, and then attenuates for a certain time. The temporal change determination part 32 determines whether noise is present based on the time variation of the filtered signal s2 (input signal s1). Specifically, the temporal change determination part 32 counts a temporal change of a signal having a time-base waveform of impulsive noise, so as to determine whether the filtered signal s2 (input signal s1) is a voice signal or a noise signal.

The temporal change determination part 32 includes a third moving average part 321, a third comparing part 322, a time variation counting part 323, and a fourth comparing part 324.

The third moving average part 321 performs moving average processing for a predetermined number of samples n (for example, n=10) in the filtered signal s2. The third moving average part 321 converts, through the moving average processing of the filtered signal s2, the filtered signal s2 into a DC signal, and generates a power spectrum of the converted DC signal (hereinafter referred to as an "input signal power spectrum").

The third comparing part 322 compares the input signal power spectrum generated by the third moving average part 321 with the third threshold V3, and outputs a signal indicating the result to the temporal change counting part 323.

The "third threshold V3" is a threshold used when the temporal change determination part 32 determines whether the filtered signal s2 (input signal s1) is a voice signal or a noise signal. The third threshold V3 is, for example, a variable being set based on signals corresponding to the environmental sound collected by the microphone 2. The device 1 can determine whether the filtered signal s2 is a voice signal or a noise signal corresponding to the usage environment of the device 1 by the third threshold V3 can be setting as a variable value. The third threshold V3 is stored in the storage part 70 (see FIG. 1).

It should be noted that the third threshold may be a fixed value corresponding to a usage environment of the device, or may be calculated by adding a certain adjustment to signals which is a base of the first threshold.

The temporal change counting part 323 counts the temporal change (attenuation time) in the time-base waveform of the signal determined to have exceeded the third threshold V3 by the third comparing part 322, and outputs the result to the fourth comparing part 324.

The fourth comparing part 324 compares a count value from the temporal change counting part 323 with the fourth threshold V4, and outputs a signal indicating the result to the logical OR operation part 33. The "fourth threshold V4" is a threshold used when the temporal change determination part 32 determines whether the filtered signal s2 (input signal s1) is a voice signal or a noise signal. The fourth threshold V4 is stored in the storage part 70 (see FIG. 1).

Referring back to FIG. 2, the logical OR operation part 33 performs logical OR operation between output from the frequency component determination part 31 (second comparing part 316) and output from the temporal change determination part 32 (fourth comparing part 324). The logical OR operation part 33 identifies the filtered signal s2 (input signal s1) as a noise signal when any one of the output from the second comparing part 316 and the output from the fourth comparing part 324 is determined as noise. Specifically, the logical OR operation part 33 detects noise from the filtered signal s2 (input signal s1) based on the determination result from the frequency component determination part 31 and the determination result from the temporal change determination part 32.

Referring back to FIG. 1, the delay part 40 stores therein an input signal s1 from the input part 10 for a predetermine time, generates a delay signal s4 by delaying the input signal s1 for the predetermined time, and outputs the delay signal s4. The "predetermined time" is a time set longer than a time required (for example, the fourth threshold V4) for processing in the temporal change determination part 32 (a below-mentioned temporal change determination processing (ST202)). Consequently, even when the temporal change determination part 32 executes the below-mentioned processing (ST202), the device 1 generates such a delay signal s4 that has no lack of information (voice) compared with the input signal s1. The delay part 40 includes a ring buffer, for example. The delay part 40 constantly generates a delay signal s4 while the delay part 40 has an input signal s1 input thereto. The delay signal s4 is input to the switching part 50 from the delay part 40.

The switching part 50 switches a signal input to the output part 80 from the switching part 50 between any one of the input signal s1 and the delay signal s4 in response to a below-mentioned control signal cs1 from a control part 60. Further, the switching part 50 switches whether signals are input from the switching part 50 to the output part 80 in response to the control signal cs1. The switching part 50 includes a signal switching part 51 and an output switching part 52.

The signal switching part 51 switches signals input from the switching part 50 to the output part 80 in response to the below-mentioned control signal cs1 from the control part 60. The signal switching part 51 includes a contact P consisting of two contacts: a contact P1 and a contact P2. The contact P1 is connected to the delay part 40. The delay signal s4 from the delay part 40 is input to the contact P1. The contact P2 is connected to the receiving part 11. An input signal s1 from the receiving part 11 is input to the contact P2. Specifically, the switching part 50 switches the contact P (contacts P1 and P2) of the signal switching part 51 to input one of the input signal s1 and the delay signal s4 to the output part 80. When the device 1 is in an initial state (state immediately after the device 1 is powered on), the contact P of the signal switching part 51 is the contact P2.

The output switching part 52 switches whether signals are input from the switching part 50 to the output part 80 in response to the below-mentioned control signal cs1 from the control part 60. The output switching part 52 is a gate circuit, for example. Specifically, for example, the output switching part 52 is in an output state (hereinafter referred to as "gate on") in which signals are output with a higher voltage applied to a gate, and in a non-output state (hereinafter referred to as "gate off") in which signals are blocked with a lower voltage applied to the gate. When the output switching part 52 is in the gate off, the switching part 50 does not input signals to the output part 80 (mute on). When the output switching part 52 is in the gate on, the switching part 50 inputs signals to the output part 80 (mute off). In other words, the output switching part 52 switches between the output state in which the output part 80 outputs output signals and the non-output state in which the output part 80 does not output output signals in response to the control signal cs1 from the control part 60. The "output signal" will be described later. When the device 1 is in the initial state, the output switching part 52 is in the gate off. A signal gs1 indicating a status of the output switching part 52 (hereinafter referred to as a "status signal") is input from the switching part 50 to the control part 60.

The control part 60 generates the control signal cs1 based on the determination result r1 from the input signal determination part 20, a detection result r2 from the noise detection part 30, and the status signal gs1 of the output switching part 52 from the switching part 50. The control signal cs1 is a signal to control the operation (switching performed by the signal switching part 51 or the output switching part 52) of the switching part 50. Specifically, the control part 60 controls the output from the output part 80 to be one of the input signal s1 and the delay signal s4, based on the determination result r1, the detection result r2, and the status signal gs1. The control part 60 includes a logical AND operation part 61 and a counting part 62.

The "control signal cs1" is a signal to switch the contact P of the signal switching part 51 between the contact P1 and the contact P2, or a signal to switch the state of the output switching part 52 between gate on and gate off, for example. The control signal cs1 is input from the control part 60 to the switching part 50.

The AND operation part 61 selects below-mentioned control (first control or second control) of the switching part 50 based on logical AND of a signal r2s indicating the detection result r2 (hereinafter referred to as a "detection result signal") and the status signal gs1. Operation of the logical AND operation part 61 will be described later.

The counting part 62 counts, when the input signal determination part 20 determines that the input signal s1 is not present (silence), the silence time.

The storage part 70 stores therein information required for the device 1 to execute the below-mentioned signal processing. The storage part 70 stores therein the first threshold V1, the second threshold V2 (see FIG. 3), the third threshold V3 (see FIG. 4), the fourth threshold V4 (see FIG. 4), and a below-mentioned fifth threshold V5 (see FIG. 11).

The output part 80 outputs one of the input signal s1 from the switching part 50 and the delay signal s4 from the switching part 50, as an output signal, to, for example, a speaker and a communication line. The speaker and the communication line are connected to the device 1.

Signal Processing of Signal Processing Device

Signal processing (operation) of the device 1 is then described.

Figure 5:
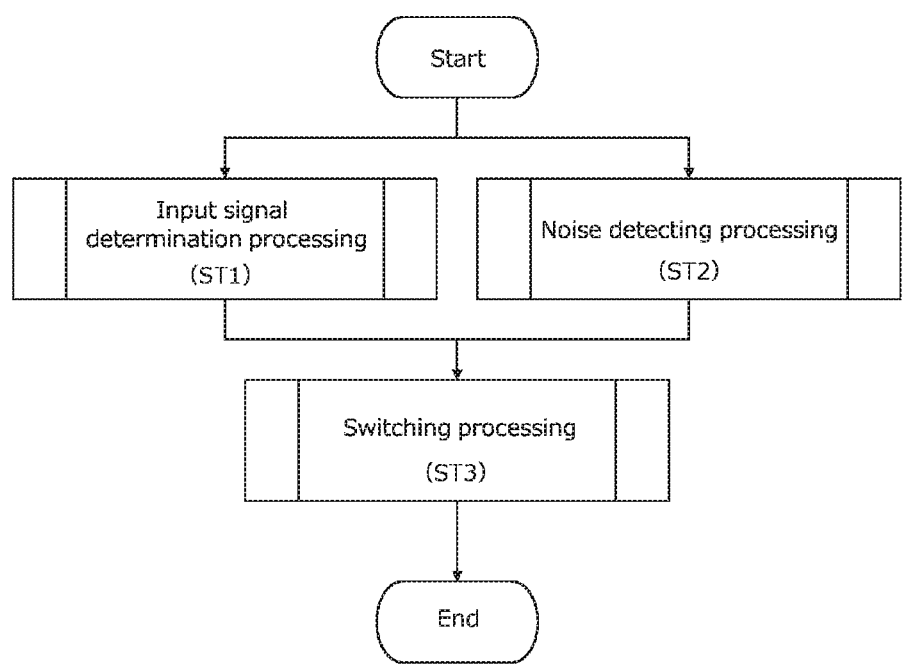
FIG. 5 is a flowchart indicating signal processing by the sound signal processing device in FIG. 1.

FIG. 5 is a flowchart indicating signal processing of the device 1.

As illustrated in FIG. 1, the input signal s1 input to the receiving part 11 of the input part 10 is input to the delay part 40 and the switching part 50. The input signal s1 is also input, as a filtered signal s2, to the noise detection part 30 via the bandpass filter 12. The filtered signal s2 is then converted to a DC signal s3 via the rectifier 13 to be input to the input signal determination part 20. The device 1 executes input signal determination processing (ST1), noise detection processing (ST2), and switching processing (ST3) for the respective input signals s1 input to the input part 10. The switching processing (ST3) is executed after the input signal determination processing (ST1) and the noise detection processing (ST2).

It should be noted that in the present invention, the input signal determination processing and the noise detection processing may be executed not only concurrently but also non-concurrently with one of the two being preceded.

Input Signal Determination Processing

The input signal determination processing (ST1) is processing that determines whether the input signal s1 (DC signal s3) from the microphone 2 is present.

Figure 6:
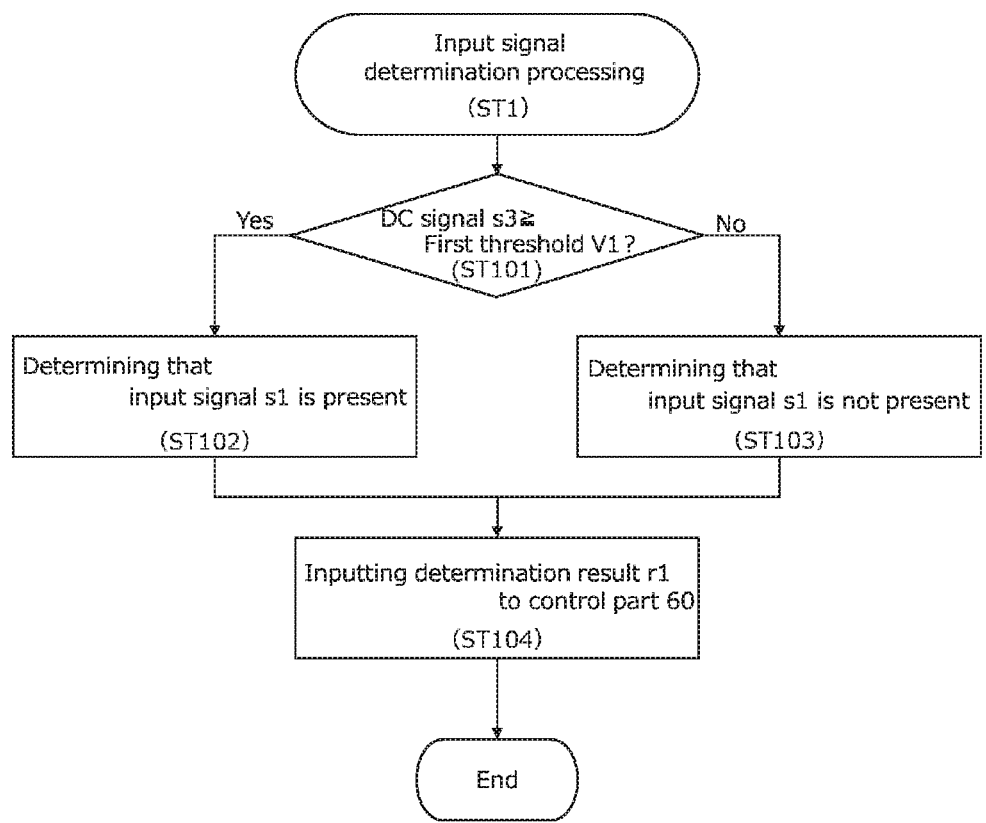
FIG. 6 is a flowchart indicating input signal determination processing among the signal processing in FIG. 5.

FIG. 6 is a flowchart indicating the input signal determination processing (ST1). The device 1 determines whether the input signal s1 (DC signal s3) is present, using the input signal determination part 20. The DC signal s3 from the input part 10 is input to the first comparing part 21 of the input signal determination part 20. The device 1 compares the DC signal s3 with the first threshold V1, using the first comparing part 21 (ST101). When the DC signal s3 is equal to or greater than the first threshold V1 ("Yes" at ST101), the device 1 determines that the input signal s1 is present (not silence) (ST102). In contrast, when the DC signal s3 below the first threshold V1 ("No" at ST101), the device 1 determines that the input signal s1 is not present (silence) (ST103). The determination result r1 is input from the input signal determination unit part 20 to the control part 60 (ST104).

As described above, the first threshold V1 is a variable being set based on signals corresponding to the environmental sound collected by the microphone 2. That is, the device 1 determines that the input signal s1 is not present (silence) when a sound collected by the microphone 2 is the environmental sound, for example. In contrast, the device 1 determines that the input signal s1 is present (not silence) when a sound collected by the microphone 2 is voice or noise, for example.

Thus, the device 1 treats sound equal to or great than the first threshold V1 (voice or noise), which is set based on the environmental sound, as the input signal s1. In contrast, the device 1 does not treat sound below the first threshold V1 (voice or noise) as the input signal s1. That is, the device 1 does not treat sound equivalent to the environmental sound (voice or noise) as the input signal s1 in the present invention.

Noise Detection Processing

The noise detection processing (ST2) is processing that detects noise included in the filtered signal s2 (input signal s1). Specifically, the noise detection processing (ST2) is processing that identifies the filtered signal s2 as a voice signal or a noise signal.

Figure 7:
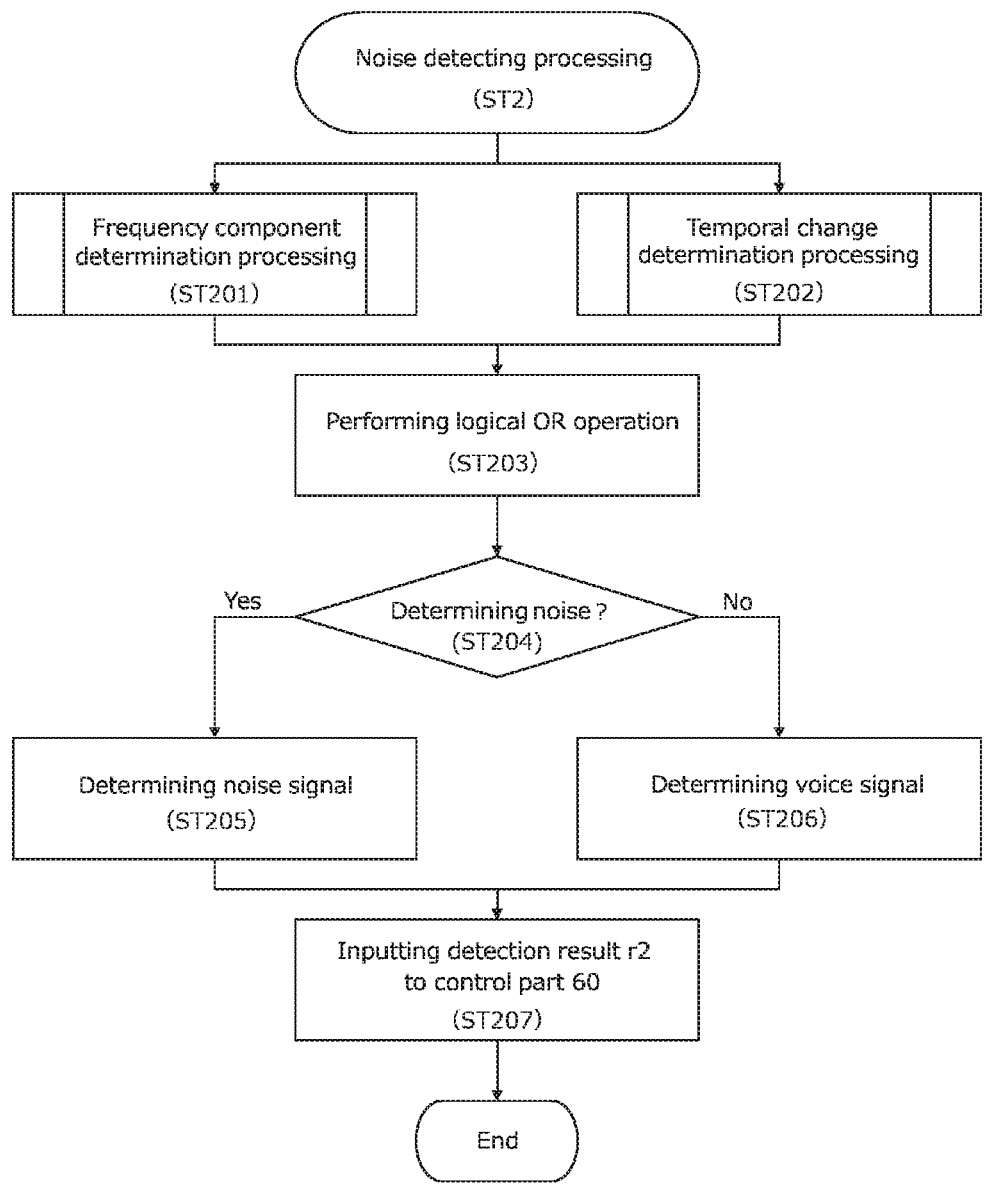
FIG. 7 is a flowchart indicating noise detection processing among the signal processing in FIG. 5.

FIG. 7 is a flowchart indicating the noise detection processing (ST2). The device 1 executes the frequency component determination processing (ST201) and the temporal change determination processing (ST202), while the filtered signal s2 is being input from the input part 10.

Figure 8:
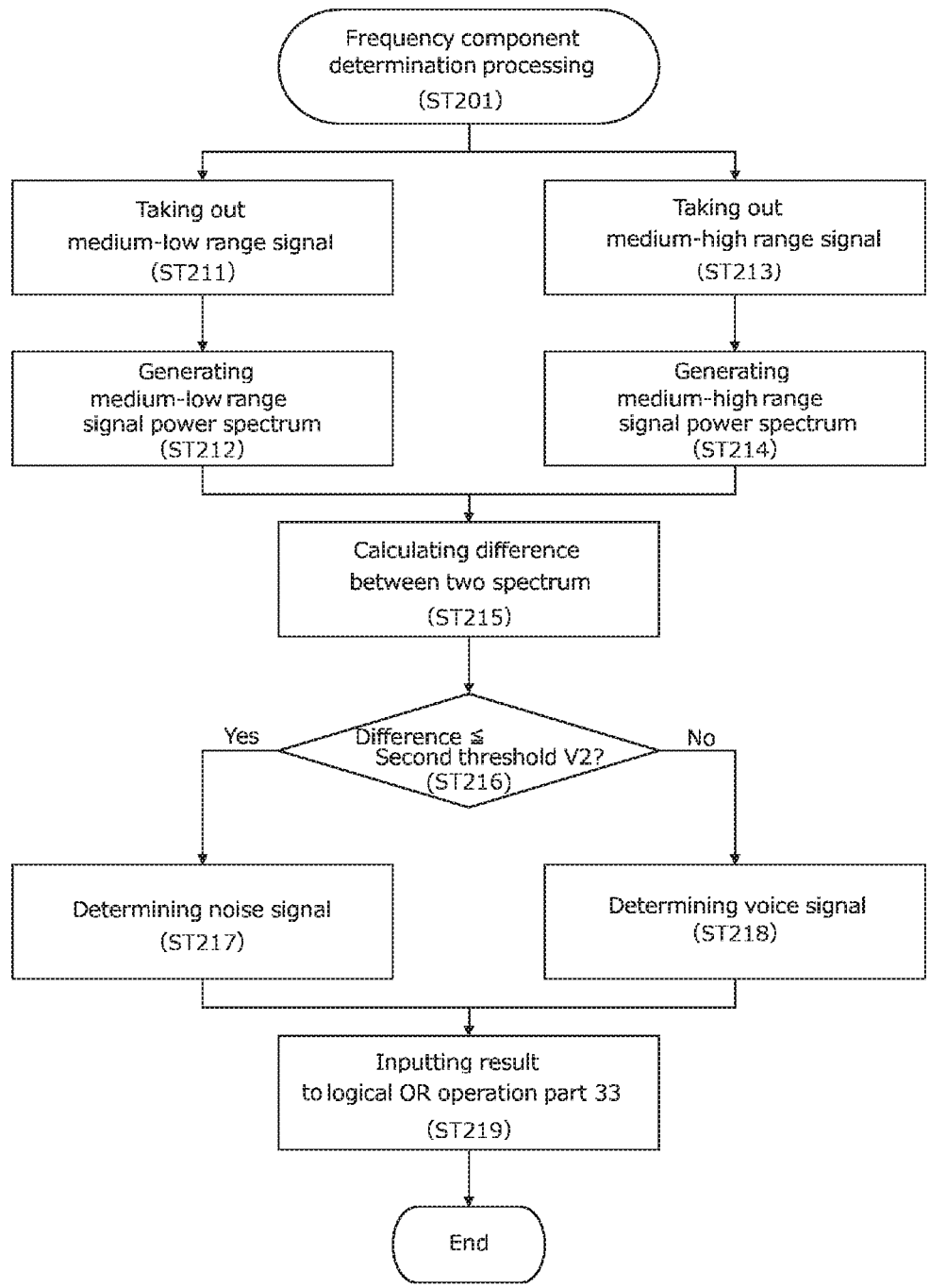
FIG. 8 is a flowchart indicating frequency component determination processing among the noise detection processing in FIG. 7.

FIG. 8 is a flowchart indicating the frequency component determination processing (ST201).

The frequency component determination processing (ST201) is processing that detects noises having substantially the same power spectrum across lower to higher ranges. The device 1 executes the frequency component determination processing (ST201), using the frequency component determination part 31.

First, the device 1 takes out a medium-low range signal from the filtered signal s2, using the lowpass filter 311 (ST211). Then, the device 1 converts the medium-low range signal into a DC signal, using the first moving average part 312, so as to generate a medium-low range signal power spectrum from the converted DC signal (ST212).

In contrast, the device 1 takes out a medium-high range signal from the filtered signals s2, using the high pass filter 313 (ST213). The device 1 converts the medium-high range signal into a DC signal, using the second moving average 314 to generate a medium-high range signal power spectrum from the converted DC signal (ST214).

The device 1 then compares the medium-low range signal power spectrum with the medium-high range signal power spectrum using the relative comparing part 315, so as to calculate difference between the two spectra (ST215). The difference is calculated by subtracting the medium-high range signal power spectrum from the medium-low range signal power spectrum, for example.

The device 1 then compares the difference calculated by the relative comparing part 315 with the second threshold V2, using the second comparing part 316 (ST216). When the difference is equal to or lower than the second threshold V2 ("Yes" at ST216), the device 1 determines that the input signal s1 is a noise signal (ST217). In contrast, when the difference is greater than the second threshold V2 ("No" at ST216), the device 1 determines that the input signal s1 is a voice signal (ST218). The device 1 inputs the determination result from the frequency component determination part 31 to the logical OR operation part 33 (ST219).

Figure 9:
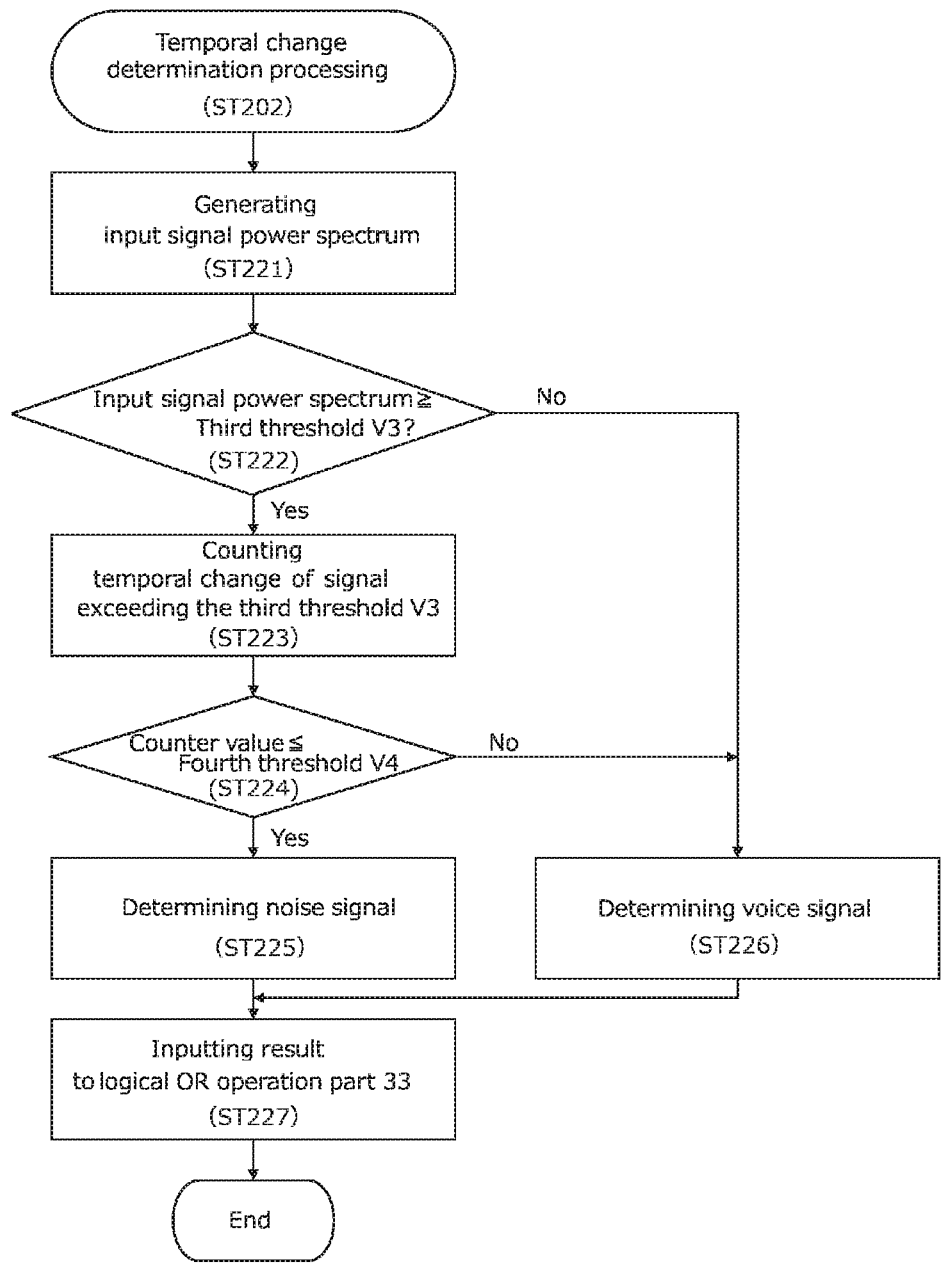
FIG. 9 is a flowchart indicating temporal change determination processing among the noise detection processing in FIG. 7.

FIG. 9 is a flowchart of the temporal change determination processing (ST202).

The temporal change determination processing (ST202) is processing that detects a noise having impulsive power spectrum. The device 1 executes temporal change determination processing (ST202), using the temporal change determination part 32.

First, the device 1 converts the filtered signal s2 into a DC signal using the third moving average part 321 and generates an input signal power spectrum from the converted DC signal (ST221).

The device 1 then compares the input signal power spectrum with the third threshold V3, using the third comparing part 322 (ST222). When the input signal power spectrum is equal to or greater than the third threshold V3 ("Yes" at ST222), the device 1 counts a temporal change in the time-base waveform of the signal exceeding the third threshold V3, using the temporal change counting part 323 (ST223). In contrast, when the input signal power spectrum is smaller than the third threshold V3 ("No" at ST222), the device 1 determines that the input signal s1 is a voice signal (ST226).

The device 1 then compares the count value from the temporal change counting part 323 with the fourth threshold V4, using the fourth comparing part 324 (ST224). When the count value is equal to or smaller than the fourth threshold V4 ("Yes" at ST224), the device 1 determines that the input signal s1 is a noise signal (ST225). In contrast, when the count value is greater than the fourth threshold V4 ("No" at ST224), the device 1 determines that the input signal s1 is a voice signal (ST226). The device 1 inputs the determination result from the temporal change determination part 32 to the logical OR operation part 33 (ST227).

Referring back to FIG. 7, the device 1 performs, using the logical OR operation part 33 logical, OR operation (ST203) between the determination result from the frequency component determination processing (ST201) and the determination result from the temporal change determination processing (ST202). The device 1 identifies the filtered signal s2 (input signal s1) as a noise signal or a voice signal based on the logical OR operation (ST204).

The device 1 determines the input signal s1 as a noise signal (ST205) when the input signal s1 is determined as a noise signal ("Yes" at ST204) in any one of the determination results from the frequency component determination processing (ST201) and from the temporal change determination processing (ST202). That is, the noise detection part 30 detects noises based on the logical OR operation between the determination result from the frequency component determination part 31 and the determination result from the temporal change determination part 32. In contrast, the device 1 identifies the input signal s1 as a voice signal (ST206) when the input signal s1 is determined as a voice signal ("No" at ST204) in both the determination result from the frequency component determination processing (ST201) and the determination result from the temporal change determination processing (ST202).

The device 1 inputs the detection result r2 from the noise detection part 30 to the control part 60 (ST207).

Switching Processing

Referring back to FIG. 5, the switching processing (ST3) is processing that generates a control signal cs1 from the determination result r1 from the input signal determination part 20 and the detection result r2 from the noise detection part 30, and switches the switching part 50 between the signal switching part 51 and the output switching part 52.

Figure 10:
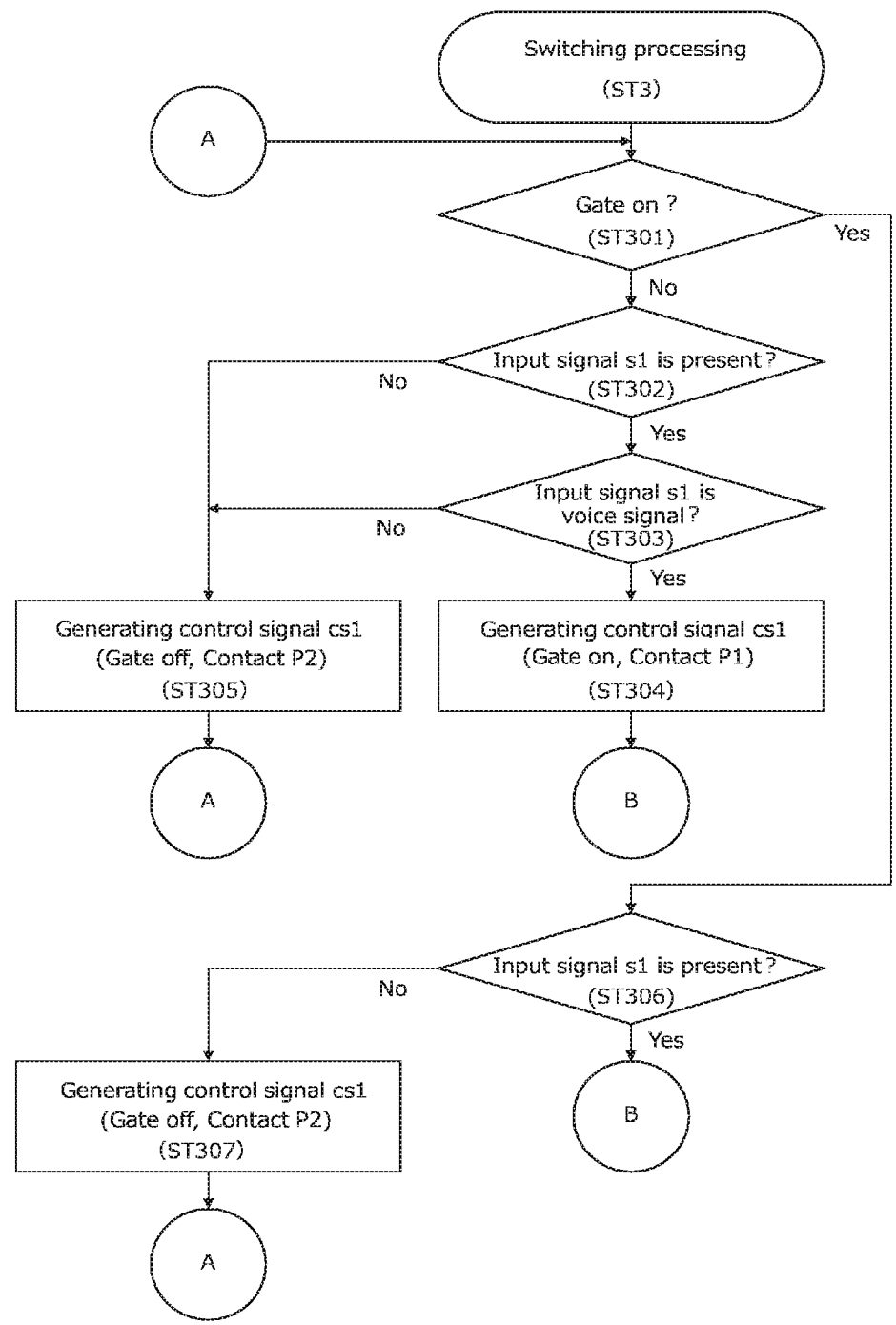
FIG. 10 is a flowchart indicating a part of switching processing among the signal processing in FIG. 5.

FIG. 10 is a flowchart indicating a part of the processing of the switching processing (ST3).

First, the device 1 checks whether the output switching part 52 is in the gate on state (output state) or the gate off state (non-output state), using the control part 60 (ST301). At this stage, the status signal gs1 of the output switching part 52 is input from the switching part 50 to the logical AND operation part 61 of the control part 60. When the output switching part 52 is in the gate off state ("No" at ST301), the device 1 checks whether the input signal s1 is present based on the determination result r1 from the input signal determination part 20 (ST302).

When the input signal s1 is present (not silence) ("Yes" at ST302), the device 1 checks whether the input signal s1 is a voice signal or a noise signal based on the detection result r2 of the noise detection part 30 (ST303). In this case, the detection result signal r2s from the noise detection part 30 is input to the logical AND operation part 61.

When the input signal s1 is a voice signal ("Yes" at ST303), the device 1 generates a control signal cs1 (control signal cs1 for switching the contact P of the signal switching part 51 to the contact P1, and for switching the output switching part 52 to the gate on state), using the control part 60 (ST304). The device 1 inputs the control signal cs1 from the control part 60 to the switching part 50, and executes a below-mentioned processing (ST308). Consequently, the contact P of the signal switching part 51 is the contact P1, and the output switching part 52 is in the gate on state (mute off). Specifically, the delay signal s4 is input from the switching part 50 to the output part 80. That is, the device 1 outputs the delay signal s4 as an output signal.

When the input signal s1 is not present (silence) ("No" at ST302) or the input signal s1 is a noise signal ("No" at ST303), the device 1 generates a control signal cs1 (control signal cs1 for holding the contact P of the signal switching part 51 to be the contact P2, and for placing the output switching part 52 into the gate off state), using the control part 60 (ST305). The device 1 inputs the control signal cs1 from the control part 60 to the switching part 50, and the processing of the present invention returns to the processing (ST301). Consequently, the contact P of the signal switching part 51 is the contact P2, and the output switching part 52 is in the gate off state (mute on). Specifically, signals (input signals s1 or delay signals s4) are not input from the switching part 50 to the output part 80. That is, the device 1 does not output any output signal.

In contrast, when the output switching part 52 is in the gate on state ("Yes" at ST301), the device 1 checks whether the input signal s1 is present based on the determination result from the input signal determination part 20 (ST306).

When the input signal s1 is present (not silence) ("Yes" at ST306), the device 1 executes a below-mentioned processing (ST308).

In contrast, when the input signal s1 is not present (silence) ("No" at ST306), the device 1 generates a control signal cs1 (control signal cs1 for holding the contact P of the signal switching part 51 to be the contact P2, and for placing the output switching part 52 into the gate off state), using the control part 60 (ST307). The device 1 inputs the control signal cs1 from the control part 60 to the switching part 50, and the processing of the present invention returns to the processing (ST301).

Figure 11:
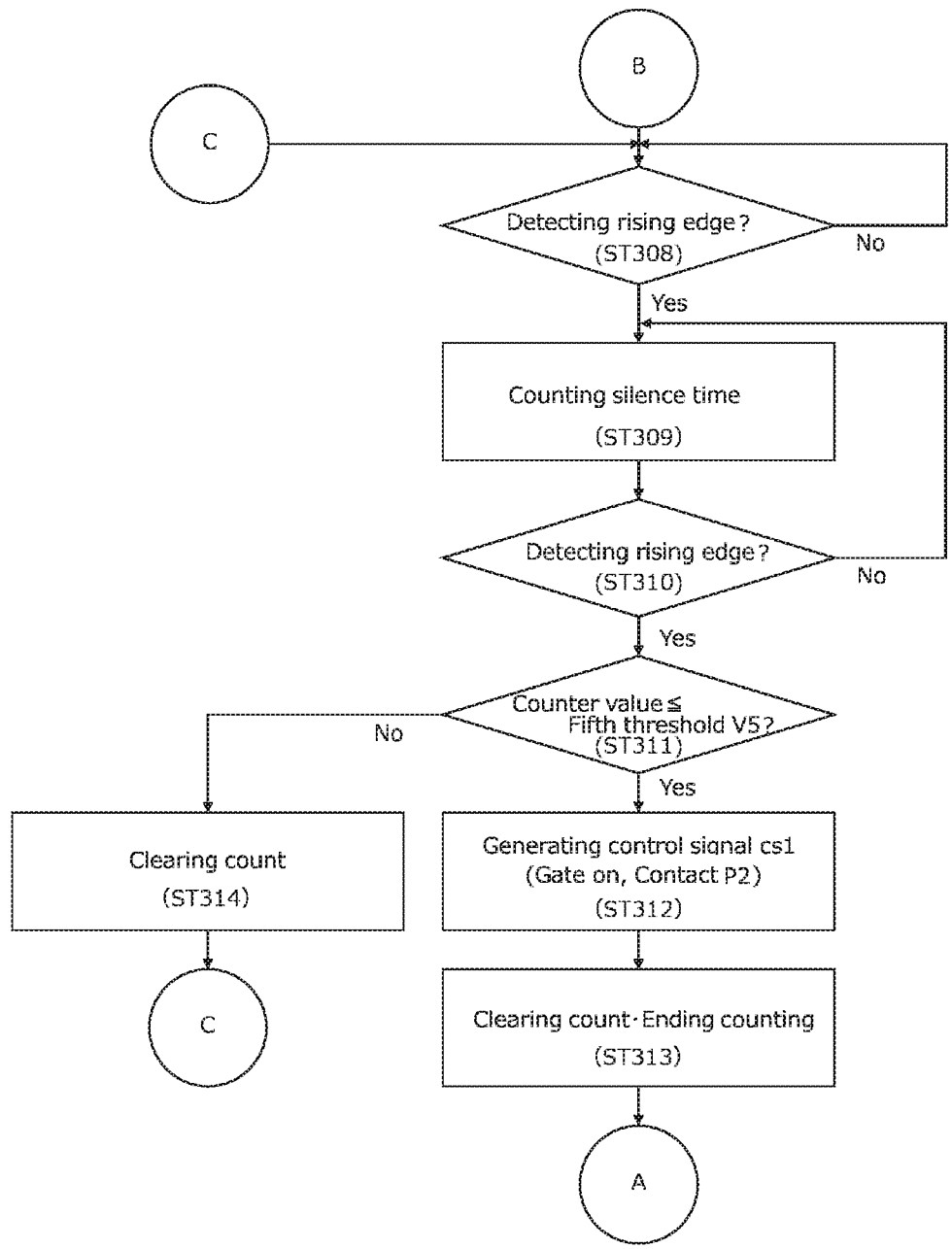
FIG. 11 is a flowchart indicating another part of the switching processing among the signal processing in FIG. 5.

FIG. 11 is a flowchart indicating another part of processing among the switching processing (ST3).

FIG. 11 illustrates processing with the output switching part 52 being in the gate on state and the input signal s1 being present, among the switching processing (ST3).

The device 1 then detects a short silence time corresponding to double consonant or breathing included in the input signal s1. A silence time is detected with, for example, a rising edge of a signal indicating silence being detected. The signal indicating silence is generated by the input signal determination part 20, and is input to the control part 60 together with the determination result r1.

The device 1 detects the rising edge of the signal indicating silence from the input signal determination part 20, using the control part 60 (ST308). When detecting the rising edge of the signal indicating silence ("Yes" at ST308), the device 1 starts counting a silence time using the counting part 62 of the control part 60 (ST309). The counting a silence time continues until the control part 60 detects a falling edge of the signal indicating silence from the input signal determination part 20 ("No" at ST310).

When the control part 60 detects the falling edge of the signal indicating silence ("Yes" at ST310), the device 1 checks whether the silence time is equal to or greater than the predetermined fifth threshold V5 (ST311). The "fifth threshold V5" is a threshold that classifies short-time silence into breathing or double consonant. Specifically, when the silence time is equal to or greater than the fifth threshold V5, the short-time silence is attributed to breathing. In contrast, when the silence time is smaller than the fifth threshold V5, the short silence time is attributed to double consonant. The fifth threshold V5 is set to a value larger than the fourth threshold V4 in the temporal change determination processing (ST202).

When the silence time is equal to or greater than the fifth threshold V5 ("Yes" at ST311), the device 1 generates a control signal cs1 (control signal cs1 switches the contact P of the signal switching part 51 to the contact P2, and holds the output switching part 52 in the gate on state), using the control part 60 (ST312). The device 1 then clears the count of the counting part 62 and ends the counting of the counting part 62 (ST313), and the processing of the present invention returns to the processing (ST301).

In contrast, when the silence time is smaller than the fifth threshold V5 ("No" at ST311), the device 1 clears the count of the counting part 62 (ST314), and the processing of the present invention returns to the processing (ST308).

Thus, the device 1 inputs a real-time input signal s1 to the output part 80 when detecting any silence time for breathing or the like. In contrast, the device 1 inputs a delay signal s4 to the output part 80 when not detecting the silence time. In other words, when the input signal determination part 20 determines that silence is present (input signal s1 is not present), and if the silence time is equal to or greater than the fifth threshold V5, the signal switching part 51 inputs the input signal s1 from the input part 10 to the output part 80. Specifically, the signal switching part 51 outputs one of the delay signal s4 and the input signal s1 to the output part 80 based on the determination result r1 from the input signal determination part 20.

Control with Control Part for Switching Performed by Output Switching Part

As illustrated in FIG. 10, the control with the control part 60 for switching performed by the output switching part 52 includes first control and second control. The first control is control for switching based on the determination result r1 from the input signal determination part 20 and the detection result r2 from the noise detection part 30 (see ST301 to ST305). The second control is control for switching based on the determination result r1 from the input signal determination part 20 (see ST301, ST306, and ST307).

When the output switching part 52 is in the gate off state, the device 1 selects the first control. Only when the output switching part 52 is in the gate off state and the detection result r2 from the noise detection part 30 is a voice signal, the device 1 switches the output switching part 52 to the gate on state. When the output switching part 52 is in the gate on state, the device 1 selects the second control. Thus, when the output switching part 52 is in the gate off state, the device 1 switches the output switching part 52 to the gate on state based on the logical AND operation between the state of the output switching part 52 and the detection result r2 from the noise detection part 30, and selects the second control.

In this case, the device 1 selects one of the first control and the second control, using the logical AND operation part 61. As described above, the logical AND operation part 61 has the detection result signal r2s and the status signal gs1 which are input thereto. The logical AND operation part 61 selects one of the first control and the second control based on the logical AND operation of the detection result signal r2s and the status signal gs1, when the output switching part 52 is in the gate off state. In contrast, the logical AND operation part 61 selects the second control when the output switching part 52 is in the gate on state. That is, the device 1 selects one of the first control and the second control based on the state of the output switching part 52. Specifically, the device 1 selects the first control when the output switching part 52 is in the gate off state (non-output state), and controls switching performed by the output switching part 52 based on the first control. In contrast, the device 1 selects the second control when the output switching part 52 is in the gate on state (output state), and controls switching performed by the output switching part 52 based on the second control. Consequently, the device 1 does not block (not gate off state) the output of the input signal s1 from the microphone 2 (or the delay signal s4), even when the microphone 2 collects noise while a user of the microphone 2 is speaking.

CONCLUSION

According to the above-described embodiment, the control with the control part 60 for switching performed by the output switching part 52 includes the first control and the second control. The first control is selected when the output switching part 52 is in the gate off state. Consequently, when the output switching part 52 is in the gate off state, the device 1 holds the output switching part 52 in the gate off state when detecting noise. Specifically, the device 1 does not misdetect noise as voice, and does not control switching for the output of signals from the microphone 2, which is caused by misdetection. That is, in the initial state, the sound signal processing device according to the present invention outputs the delay signal s4 (mute off) when a voice signal is input thereto, and does not output any signals (mute on) when a noise signal is input thereto.

In contrast, the second control is selected when the output switching part 52 is in the gate on state. Consequently, when the output switching part 52 is in the gate on state, the device 1 holds the output switching part 52 in the gate on state, even when detecting noise. Specifically, in a state in which a user of a microphone 2 is speaking (hereinafter referred to as a "speaking state"), the device 1 outputs the input signal s1 from the microphone 2 (or the delay signal s4), even when the microphone 2 collects noise. That is, the device 1 does not block output of voice signals even when detecting noise during the output of the voice signals.

According to the above-described embodiment, the control part 60 includes the logical AND operation part 61. The device 1 performs the logical AND operation between the detection result signal r2s and the status signal gs1, using the logical AND operation part 61, and selects one of the first control and the second control based on the logical AND operation. Consequently, only when the output switching part 52 is in the gate off state and the detection result r2 of the noise detection part 30 is a voice signal, the device 1 switches the output switching part 52 to the gate on state, and selects the second control. Specifically, in the initial state, the device 1 outputs the voice signal (delay signal s4) (mute off) when a voice signal is input thereto, and does not output any signals (mute on) when a noise signal is input thereto. In contrast, in the speaking state, the device 1 outputs one of the input signal s1 and the delay signal s4, even when detecting noise. That is, the device 1 does not block output of voice signals even when detecting noise during the output of the voice signals.

Further, according to the above-described embodiment, the input signal determination part 20 determines whether the input signal s1 from the input part 10 is present based on a result of comparison between signals (first threshold V1) corresponding to the environmental sound and the input signal s1 (DC signal s3) from the input part 10. Thus, the device 1 can determine whether the input signal s1 is present according to the usage environment of the device 1 (for example, the existence of an air conditioner in a room in which the device 1 is installed, the size of the room, and a gain value of the microphone 2).

Further, according to the above-described embodiment, the noise detection part 30 includes the frequency component determination part 31 and the temporal change determination part 32, and detects noise based on the determination results from each of the frequency component determination part 31 and the temporal change determination part 32. Thus, the device 1 can precisely detect composite noise that provides waveforms in various shapes.

Further, the device 1 outputs the delay signal s4 at the beginning of speaking, and outputs a real-time input signal s1 when detecting a short silence time corresponding to breathing or the like. Specifically, the device 1 prevents what-is-called "loss of voice signals at the beginning", which is generated in, for example, processing executed by the noise detection part 30.

It should be noted that, according to the above-described embodiment, the switching part 50 includes the output switching part 52. Alternatively, the output part may include an output switching part. In this case, a control signal that switches a state between gate on and gate off is input from a control part to an output part.

Moreover, in the device, a configuration of the control part is not limited to the configuration of the present embodiment. Specifically, the control part may be comprised of a control circuit that controls a signal switching part and a control circuit that controls an output switching part, for example.

The device may further include a plurality of input parts. Specifically, the device may include six input parts (6ch) to process input signals from six microphones, for example.

Further, the device may detect a short silence time based on intervals of continuous input signals. Specifically, the device may detect a falling edge of a certain input signal, so as to count a silence time, and may detect a rising edge of the subsequent input signal so as to end counting of the silence time, for example. In other words, when the input signal determination part determines that silence occurs (input signal is not present), the signal switching part inputs input signals from the input part to the output part when the silence time is equal to or greater than the fifth threshold, and outputs delay signals from the delay part to the output part when the silence time is smaller than the fifth threshold.

The invention claimed is:

1. A sound signal processing device comprising:
an input part to which a signal from a microphone is input;
an input signal determination part that determines whether an input signal from the input part is present;
a noise detection part that detects noise included in the input signal from the input part;
an output part that outputs the input signal as an output signal;
an output switching part that performs switching between an output state in which the output part outputs the output signal and a non-output state in which the output part does not output the output signal; and
a control part that controls the switching performed by the output switching part, wherein
a control of the switching by the control part includes; a first control that controls the switching based on a determination result from the input signal determination part and a detection result from the noise detection part; and a second control that controls the switching based on the determination result from the input signal determination part, and one of the first control and the second control is selected based on a state of the output switching part.

2. The sound signal processing device according to claim 1, wherein the first control is selected when the output switching part is in a non-output state, and the second control is selected when the output switching part is in an output state.

3. The sound signal processing device according to claim 1, wherein the control part includes a logical AND operation part to which a detection result signal indicating a detection result from the noise detection part and a status signal indicating a state of the output switching part are input, and the logical AND operation part selects one of the first control and the second control based on logical AND operation between the detection result signal and the status signal.

4. The sound signal processing device according to claim 1, wherein the microphone collects an environmental sound of a place in which the microphone is installed, and the input signal determination part determines whether the input signal from the input part is present based on a result of comparison between signals corresponding to the environmental sound and the input signal from the input part.

5. The sound signal processing device according to claim 1, wherein the output part does not output the output signal when the noise detection part detects the noise.

6. The sound signal processing device according to claim 1, wherein the noise detection part includes a frequency component determination part that determines whether the noise is present based on a frequency component of the input signal; and a temporal change determination part that determines whether the noise is present based on a temporal change of the input signal, and the noise detection part detects the noise based on a determination result from the frequency component determination part and a determination result from the temporal change determination part.

7. The sound signal processing device according to claim 6, wherein the noise detection part detects the noise based on logical OR operation between the determination result from the frequency component determination part and the determination result from the temporal change determination part.

8. The sound signal processing device according to claim 1, the device further comprising:

a delay part that delays outputting the input signal input from the input part; and a signal switching part to which a delay signal from the delay part and the input signal from the input part are input, the signal switching part that outputs one of the delay signal input from the delay part and the input signal input from the input part; wherein the output part outputs the delay signal or the input signal input from the signal switching part, as the output signal.

9. The sound signal processing device according to claim 8, wherein the signal switching part inputs one of the delay signal and the input signal to the output part based on the determination result from the input signal determination part.

10. The sound signal processing device according to claim 9, wherein the signal switching part inputs the input signal from the input part to the output part when the input signal determination part determines that the input signal from the input part is not present.

* * * * *